(12) United States Patent
Hattori

(10) Patent No.: US 8,757,899 B2
(45) Date of Patent: Jun. 24, 2014

(54) OPTICAL CONNECTOR

(75) Inventor: Yoshikazu Hattori, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 205 days.

(21) Appl. No.: 13/228,745

(22) Filed: Sep. 9, 2011

(65) Prior Publication Data

US 2012/0076463 A1   Mar. 29, 2012

(30) Foreign Application Priority Data

Sep. 24, 2010  (JP) ................ 2010-214356

(51) Int. Cl.
*G02B 6/36* (2006.01)
(52) U.S. Cl.
USPC .......................................................... 385/92
(58) Field of Classification Search
USPC ....................................... 385/88, 92
See application file for complete search history.

(56) References Cited

U.S. PATENT DOCUMENTS

| | | | | |
|---|---|---|---|---|
| 6,254,278 B1 * | 7/2001 | Andrews et al. | ............... | 385/53 |
| 7,074,066 B2 * | 7/2006 | Pepe | .................. | 439/321 |
| 7,255,489 B2 * | 8/2007 | Krahenbuhl et al. | .......... | 385/88 |
| 7,335,065 B1 * | 2/2008 | Chen | .................. | 439/654 |
| 7,744,288 B2 * | 6/2010 | Lu et al. | ............... | 385/60 |
| RE42,522 E * | 7/2011 | Zimmel et al. | ............... | 385/55 |
| 8,628,252 B2 * | 1/2014 | Matsumoto et al. | ............ | 385/56 |

| | | | |
|---|---|---|---|
| 2005/0041928 A1 | 2/2005 | Zimmel et al. | |
| 2005/0215101 A1 | 9/2005 | Pepe | |
| 2006/0002662 A1 | 1/2006 | Manning et al. | |

FOREIGN PATENT DOCUMENTS

| | | |
|---|---|---|
| JP | 03-105302 | 5/1991 |
| JP | 04-208904 | 7/1992 |
| JP | 2001-141961 | 5/2001 |
| JP | 2006-18296 | 1/2006 |
| JP | 2007-537462 | 12/2007 |

OTHER PUBLICATIONS

Extended European Search Report for corresponding European Application 11181206.1-2216; dated Dec. 22, 2011.

* cited by examiner

*Primary Examiner* — Daniel Petkovsek
(74) *Attorney, Agent, or Firm* — Staas & Halsey LLP

(57) ABSTRACT

An optical connector assembly includes: an optical connector having a connection portion at a top end thereof, the connection portion being connected to an optical module, the optical connector having a latch and a lever disposed on a side surface thereof, the latch securing connection between the optical connector and the optical module, the lever releasing the latch; a housing having a through-hole that incorporates the optical connector therein and an opening that is formed at a position at which part of the lever of the optical connector protrudes through the opening, the opening communicating with the through-hole; and a cover having the housing disposed therein, the cover having a plate-like protruding portion on an inner wall thereof, the protruding portion protruding toward the housing; wherein when the protruding portion is located at a position of the opening, the protruding portion presses the lever.

5 Claims, 11 Drawing Sheets

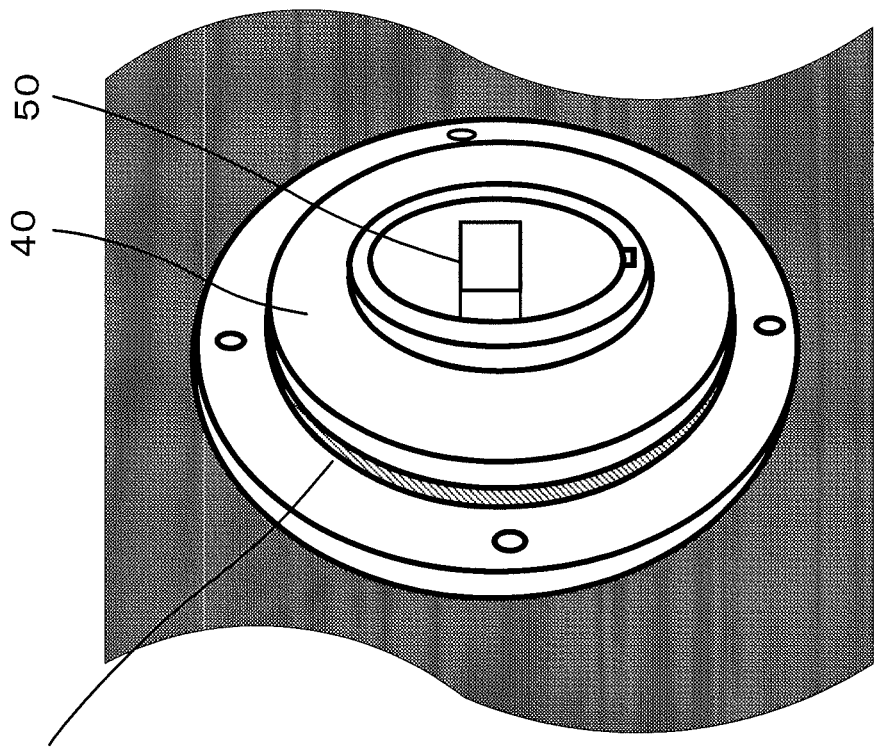
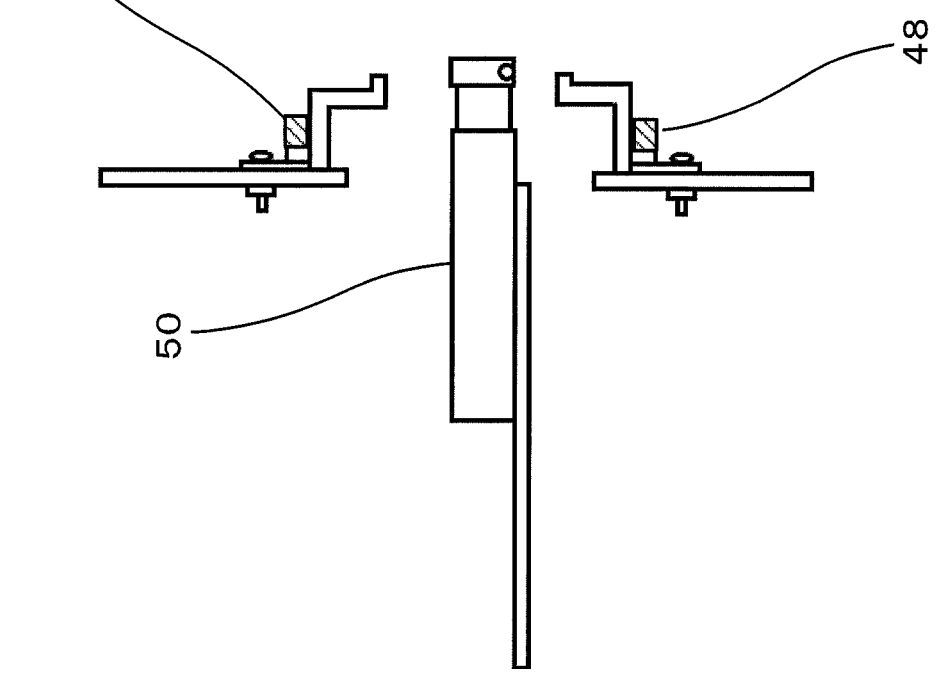

OPTICAL CONNECTOR

CROSS-REFERENCE TO RELATED APPLICATION

This application is based upon and claims the benefit of priority from the prior Japanese Patent Application No. 2010-214356 filed on Sep. 24, 2010, the entire contents of which are incorporated herein by reference.

FIELD

The embodiments disclosed herein are relates to a connector of an optical cable with a cover.

BACKGROUND

With the increase in transmission speed from wireless base station apparatuses to switching systems, an optical transmission method has been used for cell phones and wireless systems. Since, in general, a wireless base station apparatus is installed outdoors, a connector portion of an optical cable connected to the apparatus needs to be waterproof. In some cases, in order to change a connector portion into a dedicated waterproof connector, a conversion cable is employed. However, since such a conversion cable is costly, a technique for directly making a connection portion between an optical module of an apparatus and an optical connector connected to the optical module waterproof is described below.

FIGS. 1A to 1D illustrate an example of an optical connector and an optical module widely used for optical transmission. FIG. 1A is a side view of the optical connector and the optical module. FIG. 1B is a top view of the optical connector and the optical module. As illustrated in FIG. 1A, an optical connector 1 is provided at the top end of an optical cable 5 in order to connect the optical cable 5 to an optical module 50 of an apparatus. As a general-purpose optical connector, an LC optical connector having a specification defined by the IEC61754-20 standard is widely used. A latch 2 having a protruding portion 6 in the middle of the upper surface thereof and a trigger lever 3 used to release the latch 2 by pressing the latch 2 are provided in the middle of the LC optical connector 1. The latch 2 and the trigger lever 3 are made of resin. The latch 2 and the trigger lever 3 are flexible. Even when the trigger lever 3 is being pressed and, thus, the latch 2 is also being pressed, the trigger lever 3 and the latch 2 return to their original shapes after the trigger lever 3 is released.

A jack 51 used for connecting the LC optical connector 1 is formed at the top end of the optical module 50. As illustrated in FIG. 1B, an opening 52 is formed in the top surface of the optical module 50. FIG. 1C is a side view of the LC optical connector 1 connected to the optical module 50. FIG. 1D is a top view of the LC optical connector 1 connected to the optical module 50. When the LC optical connector 1 is plugged into the optical module 50, the latch 2 is temporarily pressed towards the body of the LC optical connector 1 by a protruding portion 6 in the jack 51. Subsequently, if the LC optical connector 1 is further plugged into the optical module 50, the protruding portion 6 of the latch 2 reaches the position of the opening 52 formed in the upper surface of the optical module 50. At that time, the pressure that is applied to the protruding portion 6 disappears. Accordingly, the latch 2 returns to its original shape. Therefore, the protruding portion 6 of the latch 2 protrudes through the opening 52. At that time, since the protruding portion 6 of the latch 2 protrudes through the opening 52 and is caught on the edge of the opening 52, the LC optical connector 1 may not be removed from the optical module 50. In order to remove the LC optical connector 1 from the optical module 50, the trigger lever 3 has to be pressed. By doing so, the latch 2 is pressed downward, and the protruding portion 6 caught by the opening 52 is released.

FIG. 2A illustrates the LC optical connector 1 with a waterproof cover 30. A portion of the LC optical connector 1 to which the optical cable 5 is attached is made waterproof by using a housing 10. Furthermore, the housing 10 is made waterproof by using the waterproof cover 30. Thus, the connecting portion of the optical connector 1 with the apparatus is made waterproof. FIG. 2B illustrates the LC optical connector 1 with a waterproof cover illustrated in FIG. 2A connected to the optical module 50 of the apparatus with a waterproof cover.

By fitting a waterproof cover 40 provided on the outer side of the apparatus so as to surround the optical module 50 with the waterproof cover 30 provided on the optical module side, the connection portion between the optical module 50 and the LC optical connector 1 is completely covered and, therefore, is made waterproof. However, after the LC optical connector 1 with the waterproof cover 30 has been connected to the apparatus, the optical cable may not be removed in order to maintain or repair a board of the apparatus. That is, since the latch 2 and the trigger lever 3 are completely covered by the waterproof cover 30, the latch may not be released. Therefore, in the case where a waterproof cover is attached, a general-purpose LC connector needs to be configured so that a latch and a trigger lever are removable by scraping, or an LC connector without a latch needs to be prepared.

The followings are reference documents.
[Document 1] Japanese Laid-open Patent Publication No. 04-208904.

SUMMARY

According to an aspect of the embodiment, an optical connector assembly includes: an optical connector having a connection portion at a top end thereof, the connection portion being connected to an optical module, the optical connector having a latch and a lever disposed on a side surface thereof, the latch securing connection between the optical connector and the optical module, the lever releasing the latch; a housing having a through-hole that incorporates the optical connector therein and an opening that is formed at a position at which part of the lever of the optical connector protrudes through the opening, the opening communicating with the through-hole; and a cover having the housing disposed therein, the cover having a plate-like protruding portion on an inner wall thereof, the protruding portion protruding toward the housing; wherein the cover is attached to the housing in a relatively movable manner, and wherein when the protruding portion is located at a position of the opening, the protruding portion presses the lever.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 7A and 7B illustrate an optical module of an apparatus and a waterproof cover of the apparatus;

DESCRIPTION OF EMBODIMENTS

Figure 1A:
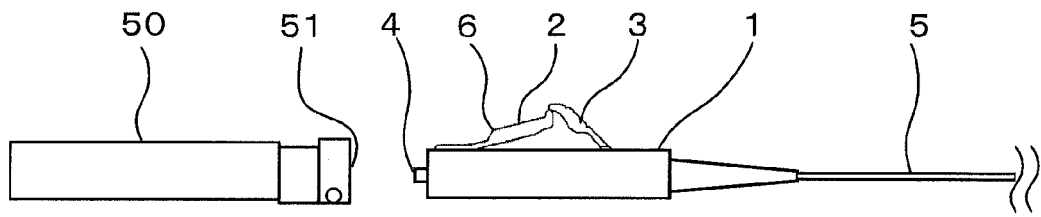
FIGS. 1A to 1D illustrate connection between an optical module and an optical connector.
Figure 1B:
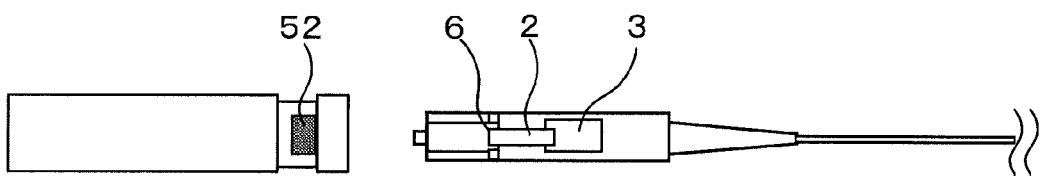
Figure 1C:
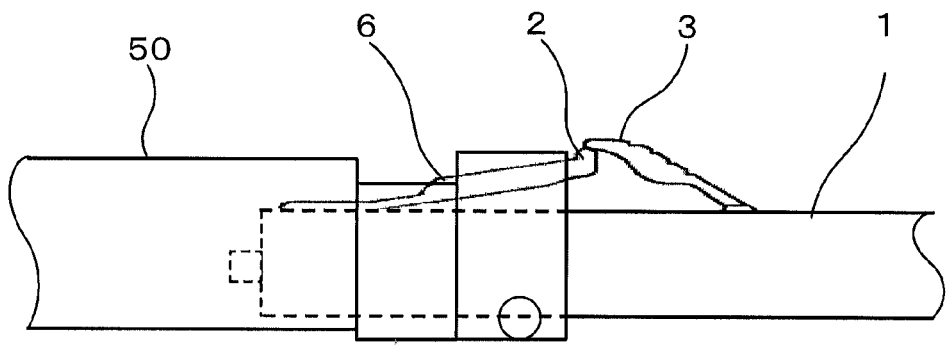
Figure 1D:
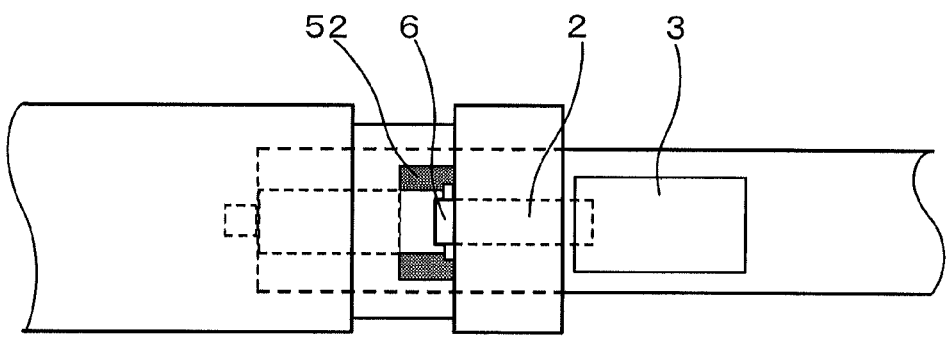
Figure 2A:
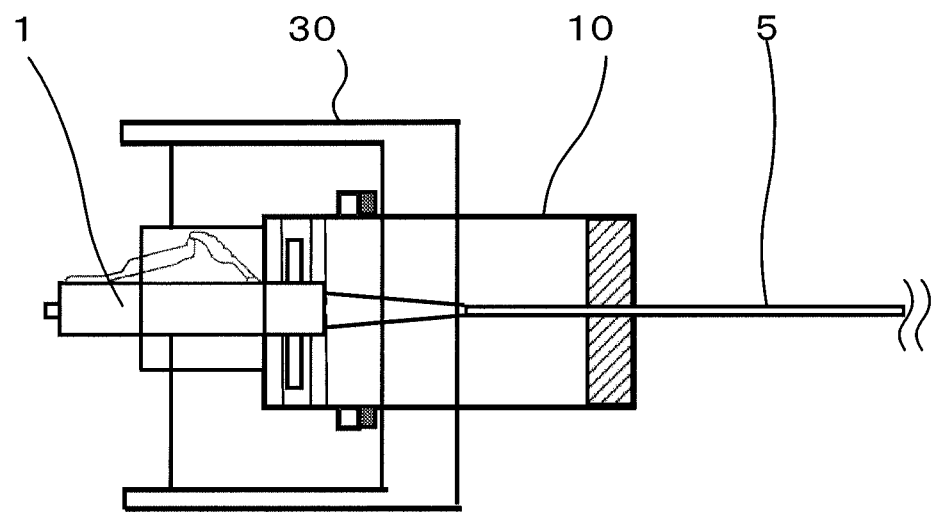
FIGS. 2A and 2B illustrate an existing optical connector with a waterproof cover.
Figure 2B:
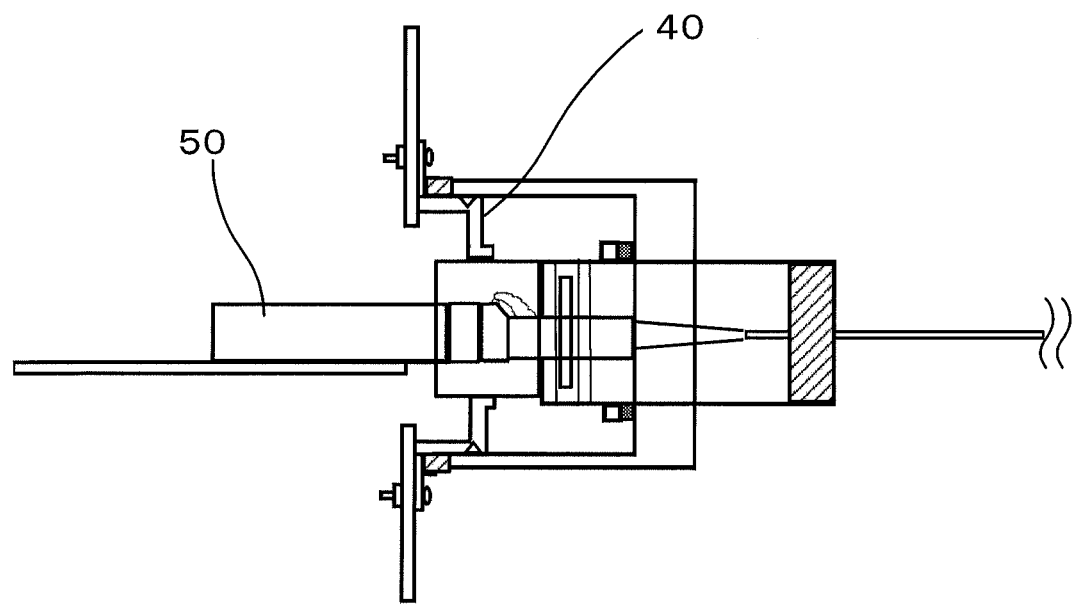
Figure 3A:
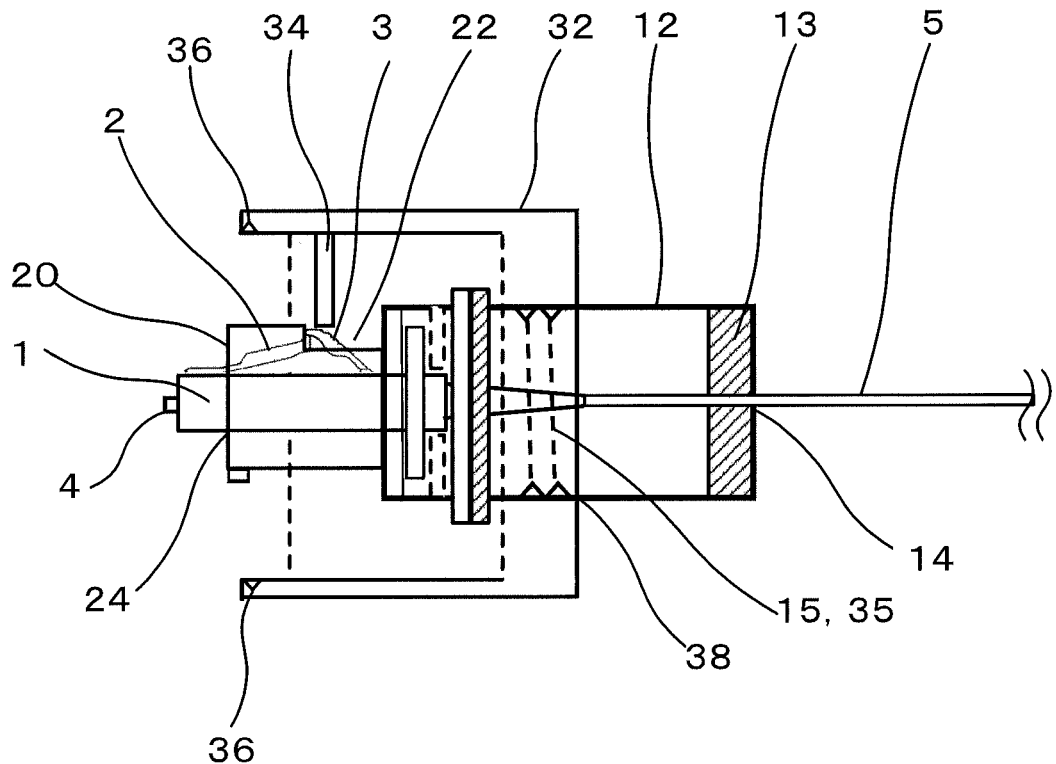
FIGS. 3A and 3B illustrate an optical connector with a waterproof cover according to an embodiment of the present disclosed technology.
Figure 3B:
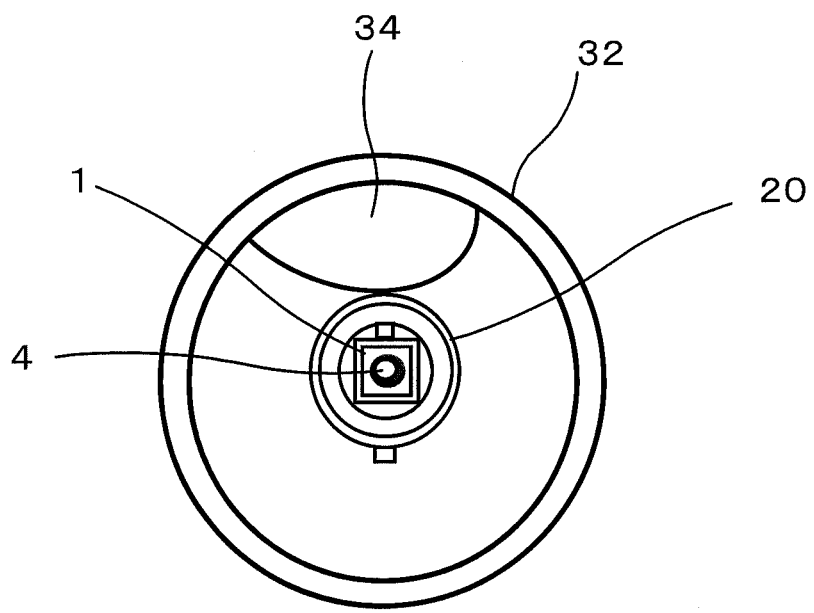

Embodiments of the present disclosed technology are described in detail below with reference to the accompanying drawings. FIGS. 3A and 3B illustrate an optical connector with a waterproof cover according to an embodiment of the present disclosed technology. FIG. 3A is a transparent side view of the optical connector with the waterproof cover. FIG. 3B is a view of the optical connector with the waterproof cover when viewed from the fitting plane.

According to the embodiment, an LC connector 1 is joined to the top end of an optical cable 5 in order to connect the optical cable 5 to an optical module of an apparatus (refer to the LC optical connector 1 illustrated in FIGS. 1A to 1D). A ferrule 4 is attached to the top end of the optical connector 1 in order to support an optical fiber in the optical connector 1. In addition, a ferrule is attached to the optical module connected to the optical connector 1. By disposing the ferrule 4 of the optical connector 1 so as to face the ferrule of the optical module, optical communication is performed.

A latch 2 that engages with the optical module 50 is provided on the upper surface of the LC optical connector 1. By pressing a trigger lever 3, the latch 2 is pressed and, therefore, engagement of a protruding portion 6 with an opening 52 of the optical module 50 is released. Thus, by pulling the LC optical connector 1, the optical cable may be removed from the optical module 50. A rear housing 12 having a cylindrical shape is integrated into the LC optical connector 1 on the side on which the optical cable 5 is connected. An outlet 14 of the optical cable 5 is made waterproof by using a flexible packing 13.

In addition, the LC optical connector 1 has a front housing 20 integrated therein. The front housing 20 has a cylindrical shape. The front housing 20 is fitted to the rear housing 12 so as to surround the body of the LC optical connector 1. The front housing 20 has a through-hole at the center thereof. The body of the LC optical connector 1 is located inside of the through-hole. Furthermore, the LC optical connector 1 has an opening 22 in the side surface of the front housing 20 (on the upper side in the drawings). The opening 22 communicates with the through-hole. When the body of the LC optical connector 1 is located inside of the through-hole, the opening 22 is located at the position of the trigger lever 3 of the LC optical connector 1 so that the top end of the trigger lever 3 protrudes through the opening 22.

Still furthermore, the LC optical connector 1 has a waterproof cover 32 integrated therein so that the waterproof cover 32 surrounds the front housing 20 and the rear housing 12. A plate-like protruding pressure portion 34 is formed on the inner wall of the waterproof cover 32. The protruding pressure portion 34 protrudes towards the front housing 20 located on the inner side. The protruding pressure portion 34 is secured to the inner wall of the waterproof cover 32. An opening 38 is formed in the bottom of the inner surface of the waterproof cover 32. The rear housing 12 is fitted into the opening 38. A spiral groove is formed on the inner wall of the opening 38 (i.e., an internal screw thread 35 is formed). The internal screw thread 35 engages with an external screw thread 15 formed on the outer wall of the rear housing 12. By rotating the waterproof cover 32 with respect to the rear housing 12, the position of the waterproof cover 32 may be changed with respect to the rear housing 12 in the left-right direction of the drawing. The engagement of the internal screw thread 35 of the waterproof cover 32 with the external screw thread 15 of the rear housing 12 effectively makes the connecting portion of the rear housing 12 and the waterproof cover 32 waterproof.

According to the present embodiment, in order to increase the waterproof effect, the external screw thread 15 and the internal screw thread 35 are provided on the connecting portion of the rear housing 12 and on the connecting portion of the waterproof cover 32, respectively. Alternatively, in order to simplify the mechanism, a concave portion and a convex portion may be formed on the fitting portion of the rear housing 12 and on the fitting portion of the waterproof cover 32, and the rear housing 12 may be slid so as to fit into the waterproof cover 32.

Figure 4:
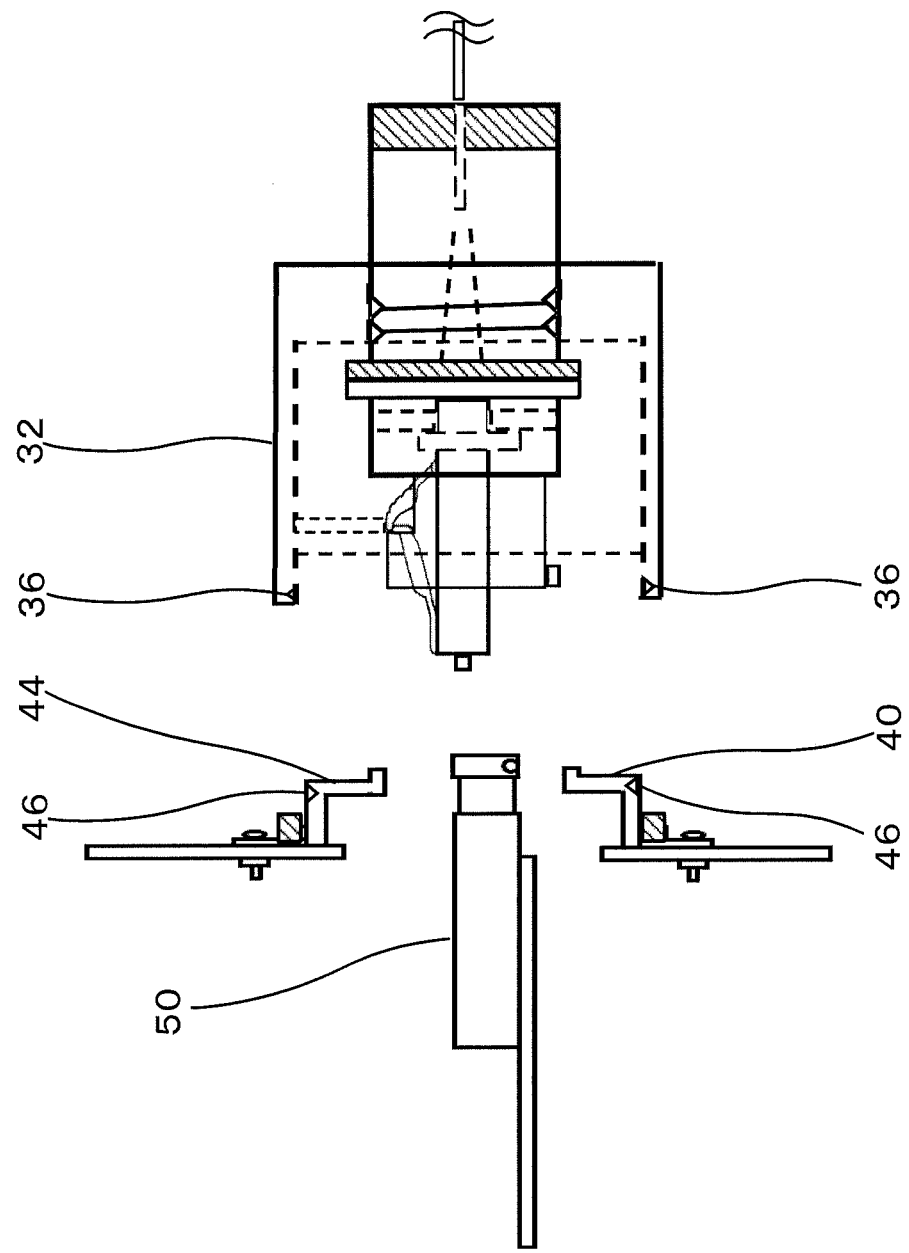
FIG. 4 illustrates an optical connector with a waterproof cover before the optical connector is fitted to an optical module according to the embodiment.

FIG. 4 illustrates the LC optical connector 1 before the LC optical connector 1 is connected to the optical module 50. As illustrated in FIG. 4, a spiral groove (i.e., an internal screw thread 36) is formed on the inner wall of a fitting portion of the waterproof cover 32 to the waterproof cover 40 of the apparatus. In addition, a spiral groove (i.e., an external screw thread 46) is formed on the outer walls of a fitting portion 44 of the waterproof cover 40 to the waterproof cover 32.

Figure 5:
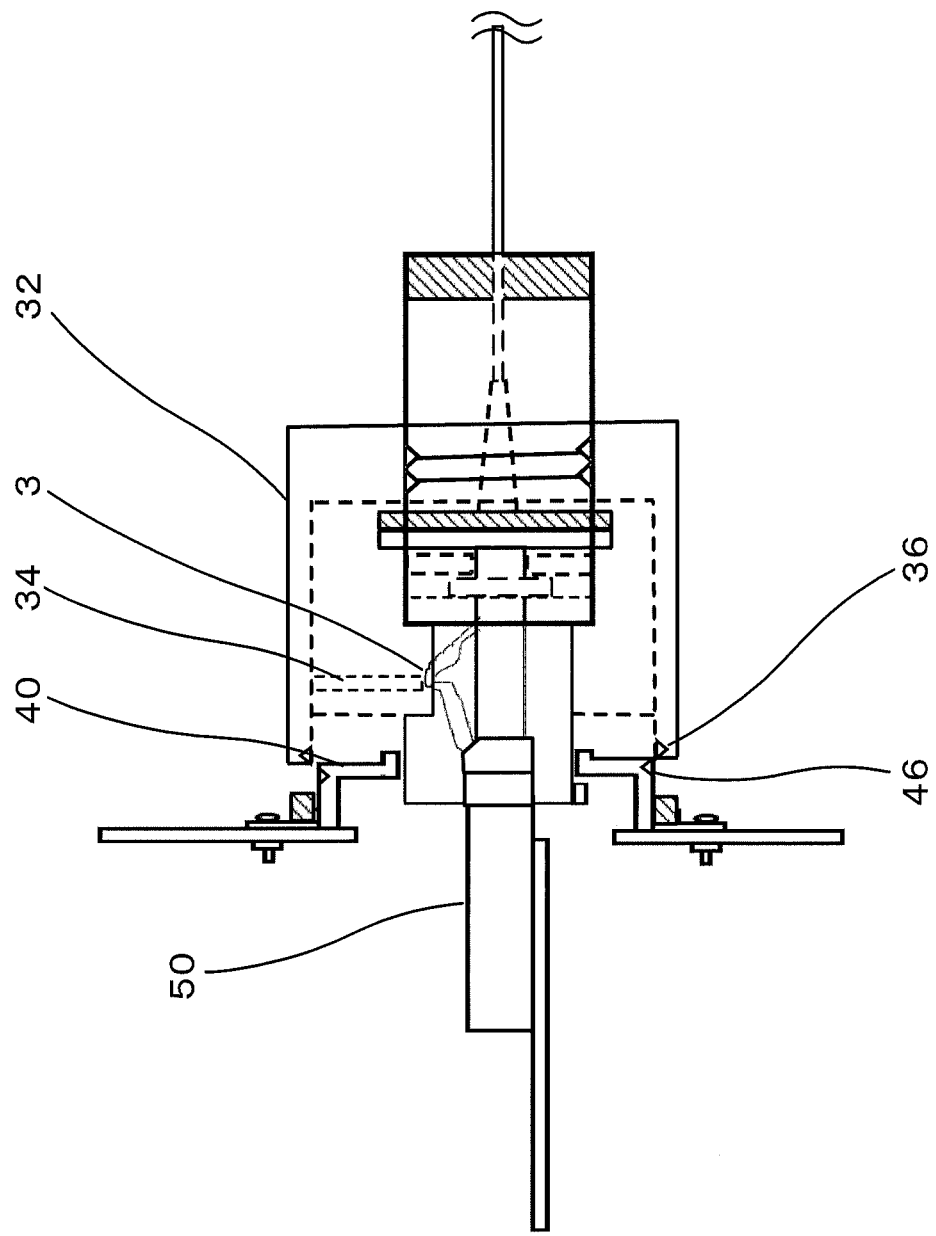
FIG. 5 illustrates the optical connector connected to an optical module according to the embodiment.

FIG. 5 illustrates the LC optical connector 1 connected to the optical module 50. In this state, the waterproof cover 40 surrounding the optical module 50 has not yet been fitted to the waterproof cover 32 of the LC optical connector 1. When, in the state illustrated in FIG. 5, the internal screw thread 36 of the waterproof cover 32 is engaged with the external screw thread 46 of the waterproof cover 40 and if the waterproof cover 32 is rotated in the counterclockwise direction when viewed from the apparatus, the screws are tightened up. In contrast, if the waterproof cover 32 is rotated in the clockwise direction, the screws are loosened. At that time, the position of the protruding pressure portion 34 is changed relative to the LC optical connector 1.

Figure 6:
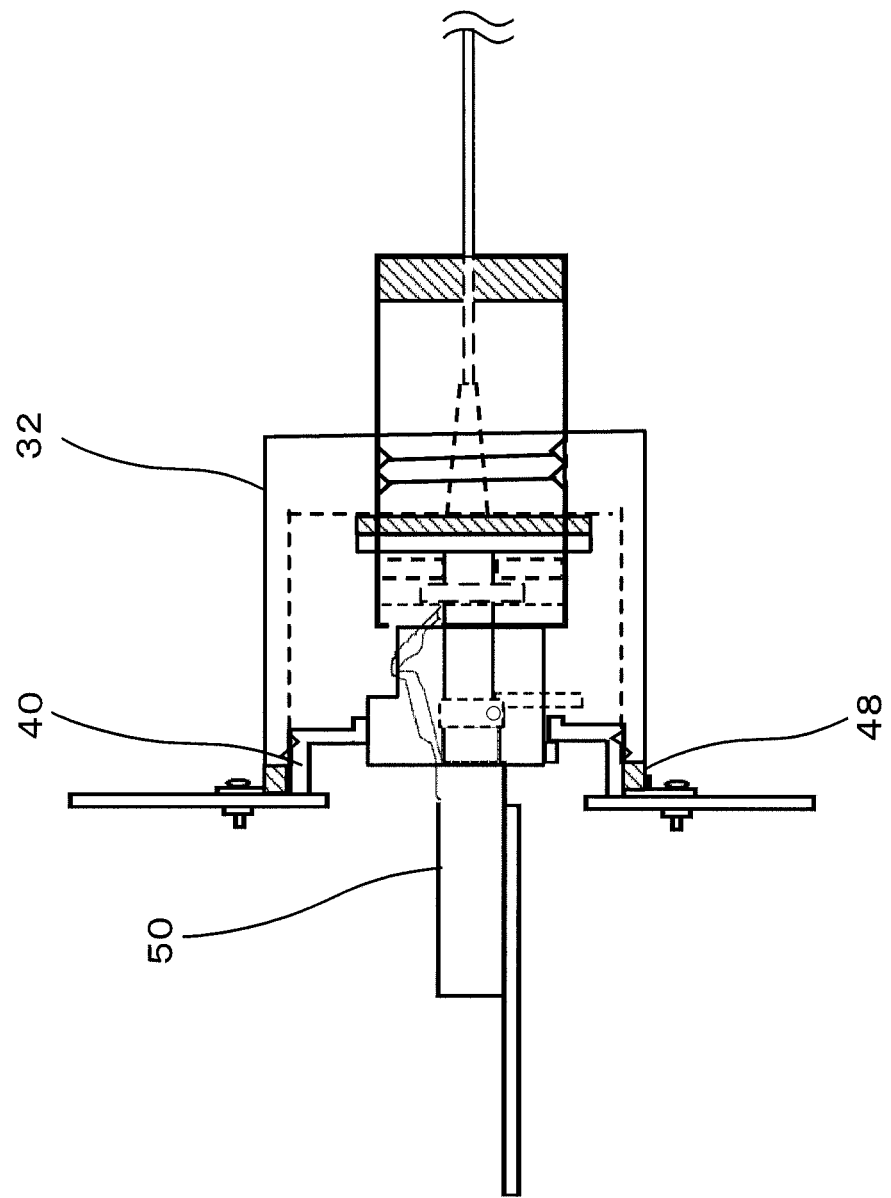
FIG. 6 illustrates the optical connector with a waterproof cover and an optical module that are fitted to each other.

FIG. 6 illustrates the waterproof cover 32 and the waterproof cover 40 that are completely joined to each other. FIGS. 7A and 7B illustrate the optical module 50 and the waterproof cover 40 of the apparatus. FIG. 7A is a transparent view of the optical module 50 and the waterproof cover 40 when viewed from the apparatus. FIG. 7B is a perspective view of the waterproof cover 40 of the apparatus when viewed at an angle from the outside of the apparatus. As illustrated in FIG. 7B, the waterproof cover 40 of the apparatus has a shape in which a low-profile cylinder is stacked on another low-profile cylinder. A waterproof elastic member 48 is attached to the peripheral portion that is close to the chassis. In this way, a waterproof effect is increased.

Referring back to FIG. 5, FIG. 5 also illustrates the LC optical connector 1 removed from the optical module 50 after the waterproof cover 32 is rotated and removed from the apparatus. In this state, the protruding pressure portion 34 of the inner wall of the waterproof cover 32 is located so as to press the trigger lever 3 of the LC optical connector 1 downward. At that time, the latch 2 is also pressed downward, and the protruding portion 6 of the latch 2 that hangs from the opening 52 is removed from the opening 52. If the LC optical connector 1 is continuously pulled together with the waterproof cover 32, the LC optical connector 1 may be removed from the optical module 50.

Figure 8A:
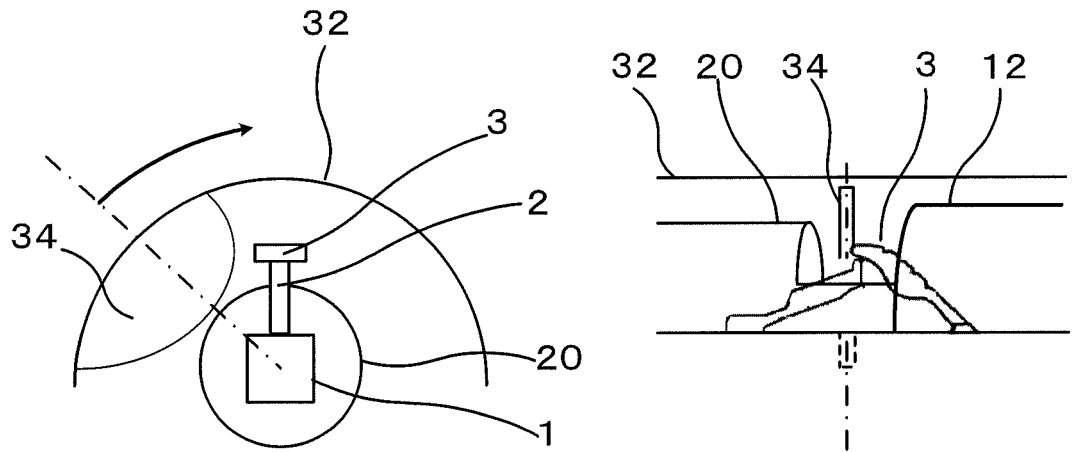
FIGS. 8A to 8C illustrate the mechanism of the optical connector according to the embodiment.
Figure 8B:
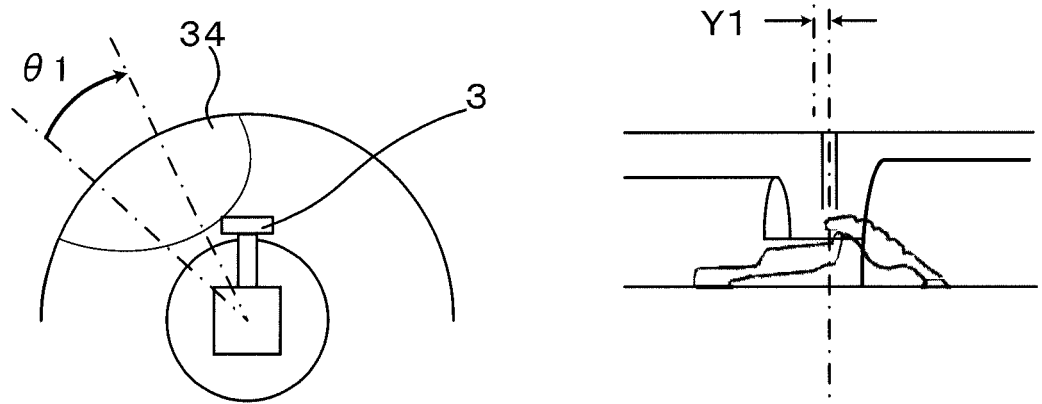
Figure 8C:
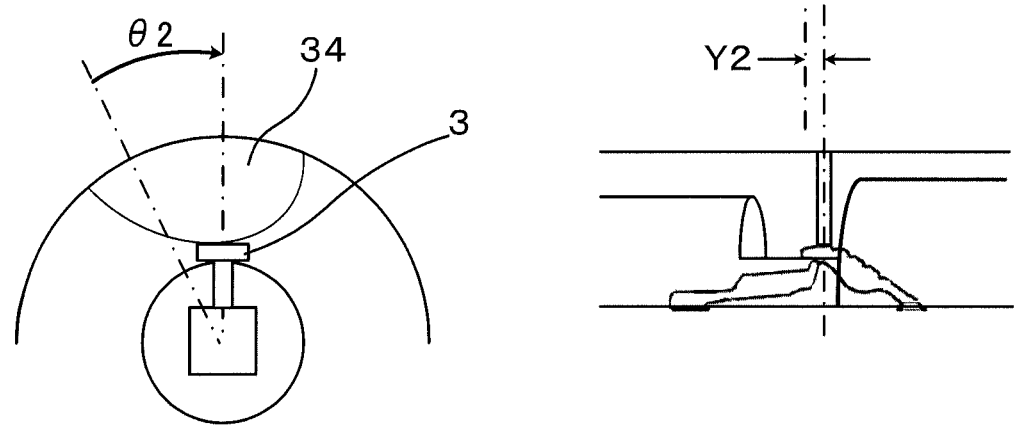

FIGS. 8A to 8C are schematic illustrations of the mechanism of the optical connector according to the present embodiment. A positional relationship between the protruding pressure portion 34 and the trigger lever 3 in accordance with rotation of the waterproof cover 32 is illustrated in FIGS. 8A to 8C. The left sections of FIGS. 8A to 8C illustrate an LC optical connector with a waterproof cover when viewed from the connecting plane of the apparatus. The right sections of FIGS. 8A to 8C illustrate a relative positional relationship between the protruding pressure portion 34 of the waterproof cover 32 and the LC optical connector 1. If, as illustrated in FIGS. 8A to 8C, the waterproof cover 32 is rotated in the clockwise direction when viewed from the apparatus, the screws of the waterproof cover 32 and the waterproof cover 40 are loosened.

If, as may be seen from comparison of the left sections of FIGS. 8A and 8B, the waterproof cover 32 is rotated by an angle of θ1 in the clockwise direction when viewed from the apparatus, the position of the protruding pressure portion 34 is moved towards the trigger lever 3 in the rightward direction by a distance of Y1 as may be seen from comparison of the right sections of FIGS. 8A and 8B. Thereafter, if, as may be seen from comparison of the left sections of FIGS. 8B and 8C, the waterproof cover 32 is further rotated by an angle of θ2 in the clockwise direction when viewed from the apparatus, the position of the protruding pressure portion 34 is further moved towards the trigger lever 3 in the rightward direction by a distance of Y2 as may be seen from comparison of the right sections of FIGS. 8B and 8C. In addition, the protruding pressure portion 34 presses the trigger lever 3 downward while contacting the trigger lever 3.

By rotating the waterproof cover 32 about the axis of the LC optical connector 1 in this manner, the protruding pressure portion 34 is moved with respect to the trigger lever 3 in the rotational direction and the rotation axis direction (i.e., in the rightward direction in FIGS. 8A to 8C). Finally, the protruding pressure portion 34 reaches the position of the trigger lever 3, and the trigger lever 3 is pressed downward by the protruding pressure portion 34. As a result, the latch 2 is also pressed downward, and the hook of the protruding portion 6 of the latch 2 is released. The design is such that, in this case, the internal screw thread 36 of the waterproof cover 32 is removed from the external screw thread 46 of the waterproof cover 40. Since the protruding pressure portion 34 is moved towards the trigger lever 3 in the rotational direction and the rotation axis direction in this manner, the surface of the protruding pressure portion 34 has a curved shape so that the protruding pressure portion 34 is in smooth contact with the top end of the trigger lever 3. In addition, in order to increase the contact area of the protruding pressure portion 34 with the trigger lever 3, it is desirable that the shape be elliptical rather than generally circular.

Figure 9A:
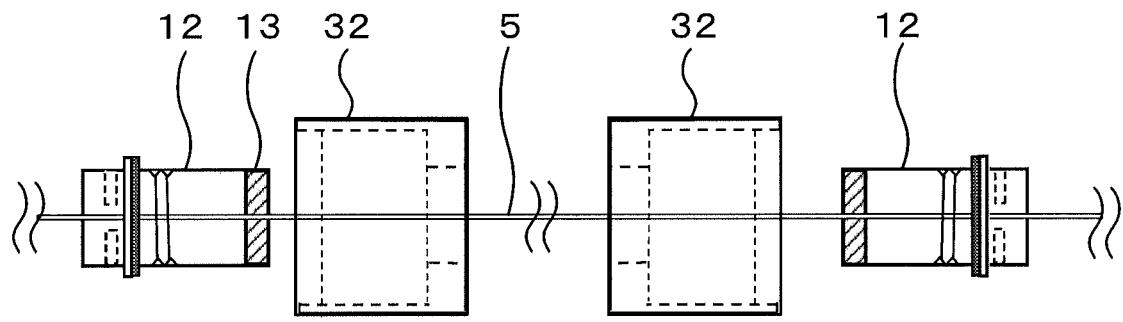
FIGS. 9A to 9C illustrate the steps of manufacturing an optical connector according to the embodiment.
Figure 9B:
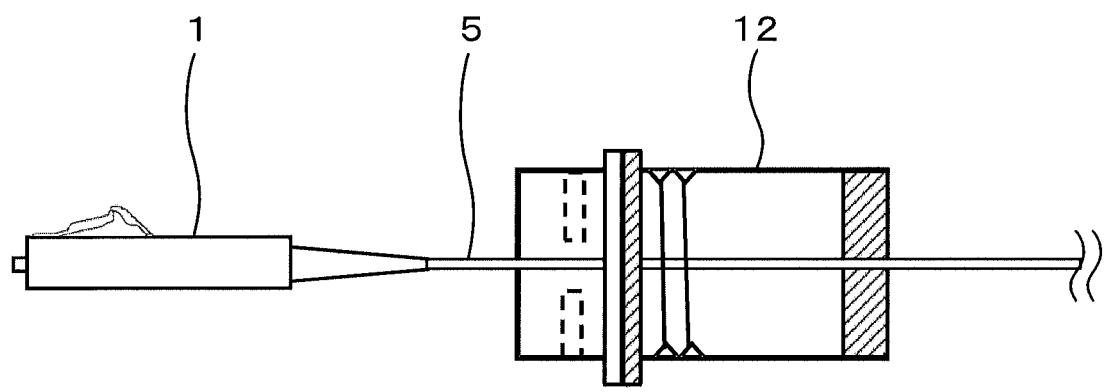
Figure 9C:
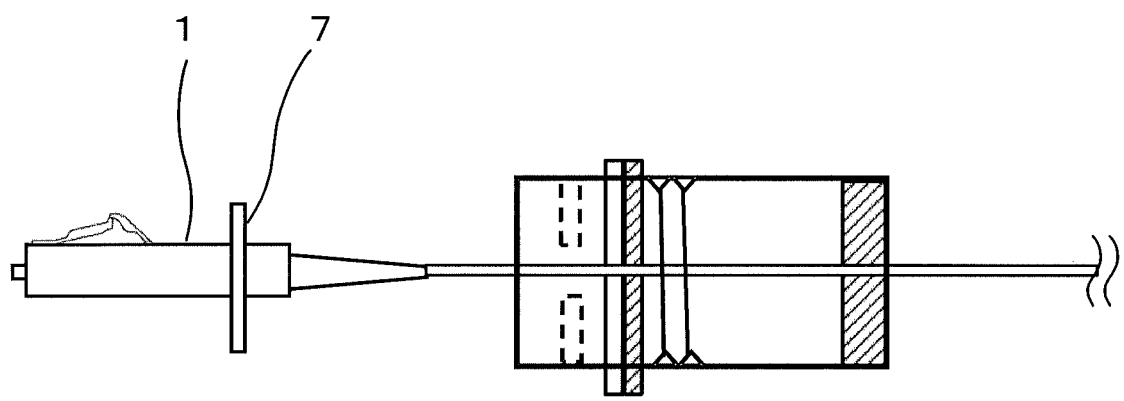

The manufacturing steps of the LC optical connector with a waterproof cover according to the present embodiment are described next with reference to FIGS. 9A to 9C, FIGS. 10A to 10C, and FIGS. 11A to 11C. First, as illustrated in FIG. 9A, the optical cable 5 is inserted into a hole of the packing 13 in the rear housing 12. Thereafter, the optical cable 5 is inserted into the waterproof cover 32. If an LC optical connector with a waterproof cover is attached to the other end of the optical cable 5, a rear housing 12 and the waterproof cover 32 are disposed so as to face in the opposite direction and the optical cable 5 is inserted in a similar manner. As illustrated in FIG. 9B, the LC optical connector 1 is connected to the top end of the optical cable 5. As illustrated in FIG. 9C, a removal prevention ring 7 is fitted into the body of the LC optical connector 1 and is secured to the body.

Figure 10A:
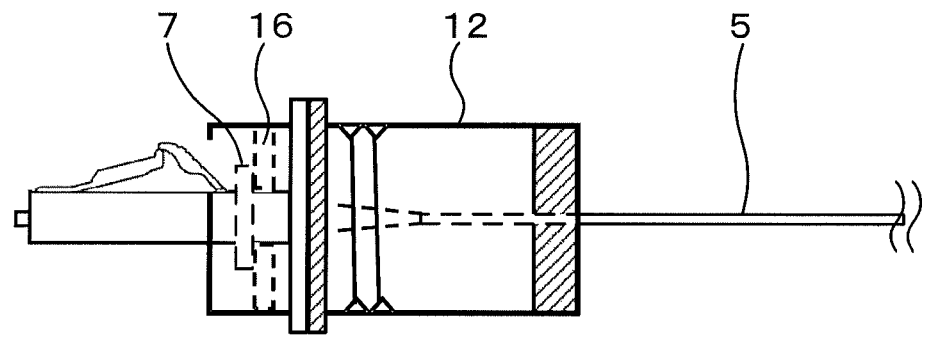
FIGS. 10A to 10C illustrate the steps of manufacturing an optical connector according to the embodiment.
Figure 10B:
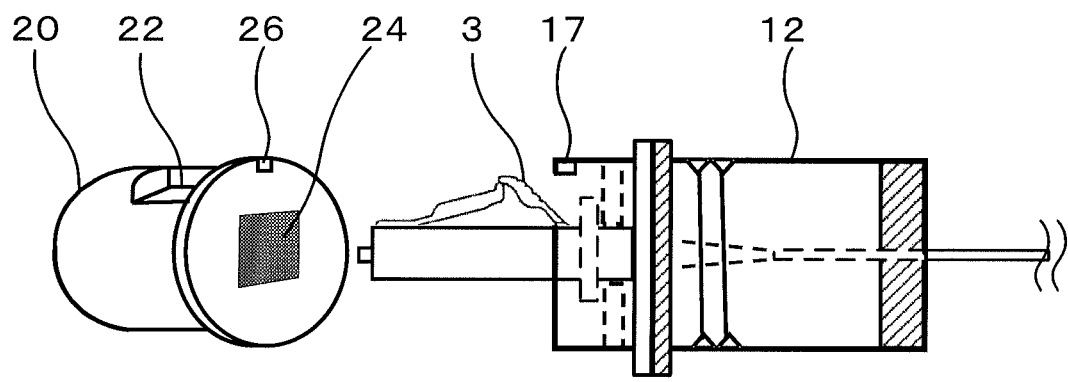
Figure 10C:
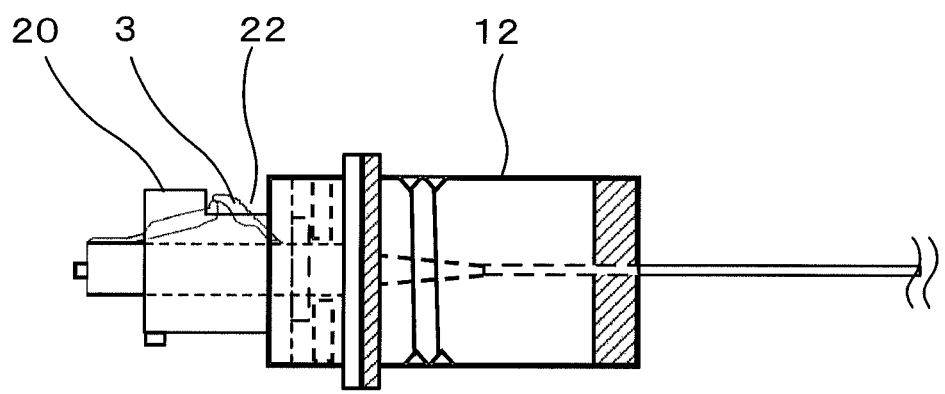

As illustrated in FIG. 10A, the optical cable 5 is pulled until the removal prevention ring 7 reaches the position of a stopper 16 of the rear housing 12. In this way, the LC optical connector 1 is fitted into the rear housing 12. As illustrated in FIGS. 10B and 10C, the body of the LC optical connector 1 is inserted into a through-hole 24 located at the center of the front housing 20, and the front housing 20 is fitted into the rear housing 12 so that a positioning hole 26 formed in the front housing 20 is fitted into a positioning protrusion 17 formed on an inner peripheral surface of the rear housing 12. At that time, the orientations are aligned so that the top end of the trigger lever 3 of the LC optical connector 1 protrudes through the opening 22 formed in the side surface of the front housing 20.

Figure 11A:
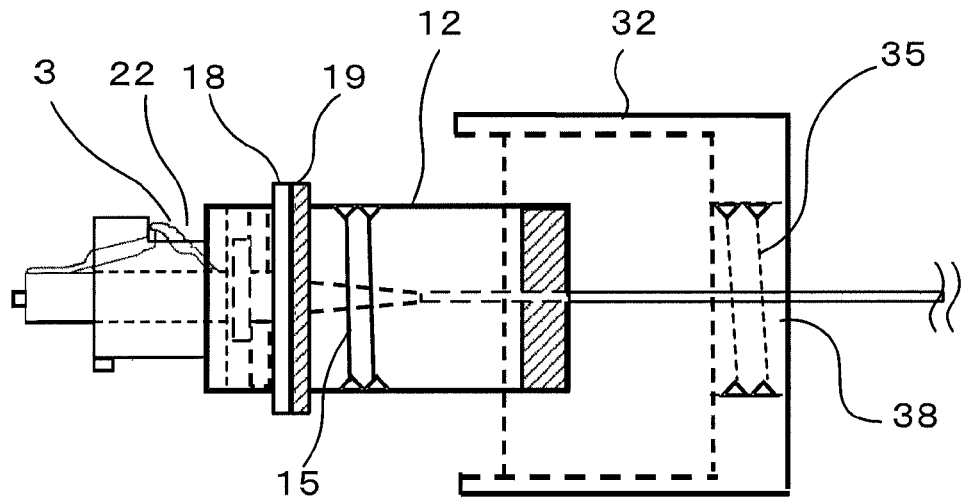
FIGS. 11A to 11C illustrate the steps of manufacturing an optical connector according to the embodiment.
Figure 11B:
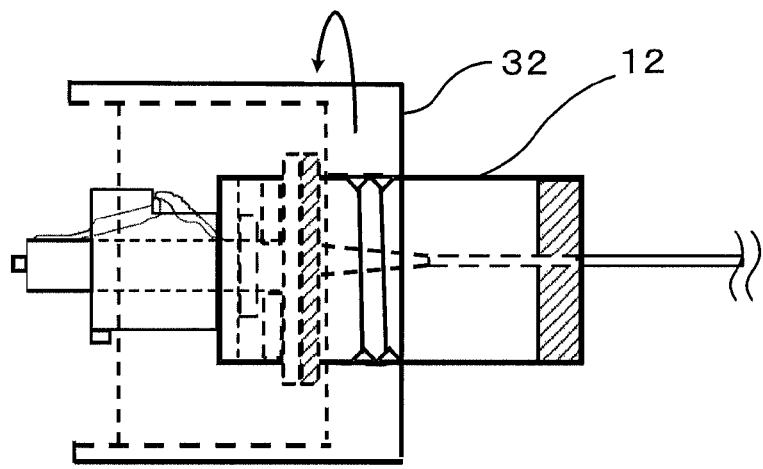
Figure 11C:
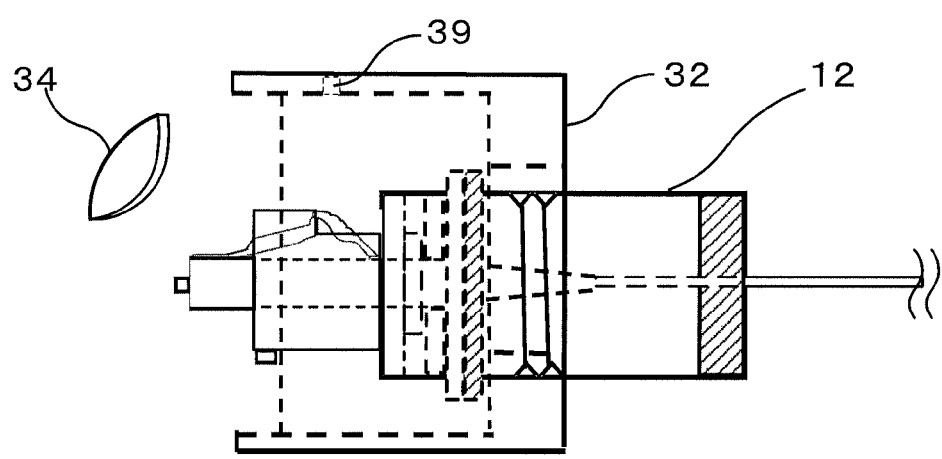

FIGS. 11A to 11C illustrate the steps of fitting the waterproof cover 32. As illustrated in FIGS. 11A and 11B, the body of the rear housing 12 is inserted into the opening 38 that corresponds to the inner bottom portion of the waterproof cover 32 having the optical cable 5 disposed therein. Thereafter, the internal screw thread 35 formed in the inner wall of the opening 38 is engaged with the external screw thread 15 formed in the outer wall of the rear housing 12, and the waterproof cover 32 is rotated with respect to the rear housing 12. Thus, the waterproof cover 32 is moved to the position of a ring 18 and a packing 19 disposed in the middle of the body of the rear housing 12. Subsequently, as illustrated in FIG. 11C, the protruding pressure portion 34 is inserted and secured to a groove formed in the inner wall of the waterproof cover 32. In this way, the LC optical connector 1 is produced.

Note that while the present embodiment has been described with reference to an LC optical connector having a latch, the present embodiment is applicable to another type of communication cable having a connector with a latch.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical connector assembly comprising:
    an optical connector having a connection portion at a top end thereof, the connection portion being connected to an optical module, the optical connector having a latch and a lever disposed on a side surface thereof, the latch securing connection between the optical connector and the optical module, the lever releasing the latch;
    a housing having a through-hole that incorporates the optical connector therein and an opening that is formed in a side surface of the housing, a part of the lever of the optical connector protruding through the opening, the opening communicating with the through-hole; and a first cover having the housing disposed therein, the first cover including an internal screw thread engaged with an external screw thread of a second cover surrounding the optical module, and a protruding portion on an inner wall thereof, the protruding portion protruding toward the housing, wherein the position of the first cover is changed with respect to the housing by rotating the first cover with respect to the housing, and wherein when the protruding portion is located at a position of the opening, the protruding portion presses the lever.

2. The optical connector assembly according to claim 1, wherein the first cover has a through-hole in which the housing is disposed, and wherein an internal screw thread is formed on an inner wall of the through-hole, and an external screw thread is formed on an outer wall of the housing, and wherein the first cover is engaged with the housing and is moved relative to the housing.

3. The optical connector assembly according to claim 1, wherein the housing includes a front housing having the opening and a rear housing connected to the front housing, and wherein the rear housing has a port through which an optical cable connected to the optical connector is led out.

4. The optical connector assembly according to claim 1, wherein a portion of the first cover by which the first cover is attached to the housing has a spiral groove so as to make it waterproof.

5. The optical connector assembly according to claim 1, wherein the protruding portion is attached to a groove formed on the inner wall so as to be removable from the groove.

* * * * *